United States Patent
Vasudeva et al.

(10) Patent No.: US 6,520,509 B1
(45) Date of Patent: Feb. 18, 2003

(54) SCREW GUIDE DEVICE WITH DRILL BIT/SCREW BIT AND COUNTER SINK/DRILL STOP MEANS

(75) Inventors: Kailash C. Vasudeva, Waterloo (CA); Maz A. Hasan, Kitchener (CA)

(73) Assignee: Maxtech Manufacturing Inc., Waterloo (CA)

( * ) Notice: Subject to any disclaimer, the term of this patent is extended or adjusted under 35 U.S.C. 154(b) by 52 days.

(21) Appl. No.: 09/635,843

(22) Filed: Aug. 11, 2000

Related U.S. Application Data

(60) Provisional application No. 60/148,589, filed on Aug. 13, 1999.

(51) Int. Cl.[7] ............................ B25B 23/10; B23B 51/08
(52) U.S. Cl. ............................ 279/145; 81/438; 81/452; 279/14; 279/30; 408/202
(58) Field of Search ........................ 279/14, 143, 145, 279/22, 30; 81/451, 452, 438; 408/202

(56) References Cited

U.S. PATENT DOCUMENTS

| | | | | |
|---|---|---|---|---|
| 768,441 A | * | 8/1904 | Fisher | 81/451 |
| 1,441,956 A | * | 1/1923 | Watson | 81/451 |
| 3,361,169 A | * | 1/1968 | Charchenko | 81/451 |
| 4,736,658 A | * | 4/1988 | Jore | 81/451 |
| 5,309,798 A | * | 5/1994 | Markwart et al. | 81/438 |
| 5,309,799 A | * | 5/1994 | Jore | 81/451 |
| 5,791,212 A | * | 8/1998 | Han | 81/453 |
| 5,975,815 A | * | 11/1999 | Zierpka et al. | 279/22 |
| 6,148,699 A | * | 11/2000 | Han | 81/451 |

* cited by examiner

Primary Examiner—Steven C. Bishop
(74) Attorney, Agent, or Firm—R. Craig Armstrong; L. Anne Kinsman; Borden Ladner Gervais LLP

(57) ABSTRACT

A holder for holding a tool bit having an elongated connector means with a first end and a second end. The elongated connector means has a central longitudinal hole, of a cross-section corresponding to the cross-section of a mounting portion of the tool bit, at the first end, and a tool mount at the second end, and where the elongated connector means has a first circumferential groove adjacent the second end and a second circumferential groove adjacent the first end. A first sleeve is arranged to reciprocally slide over the connector between a first end position and a second end position, where the first sleeve has a third end facing the tool bit and a fourth end facing the hand tool. The first sleeve has an inwards facing annular ridge arranged at the fourth end of the first sleeve, so that the annular ridge is seated in the first circumferential groove when the sleeve is in the first end position, and the annular ridge is seated in the second circumferential groove when the sleeve is in the second end position.

15 Claims, 21 Drawing Sheets

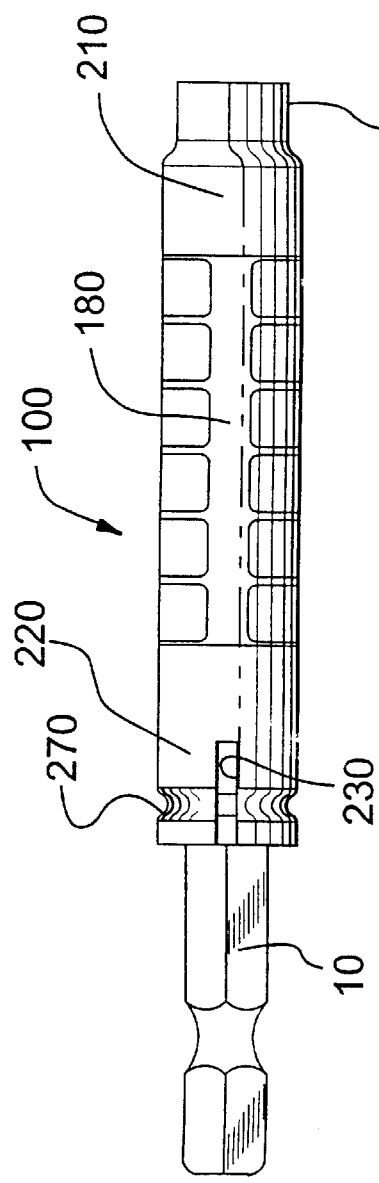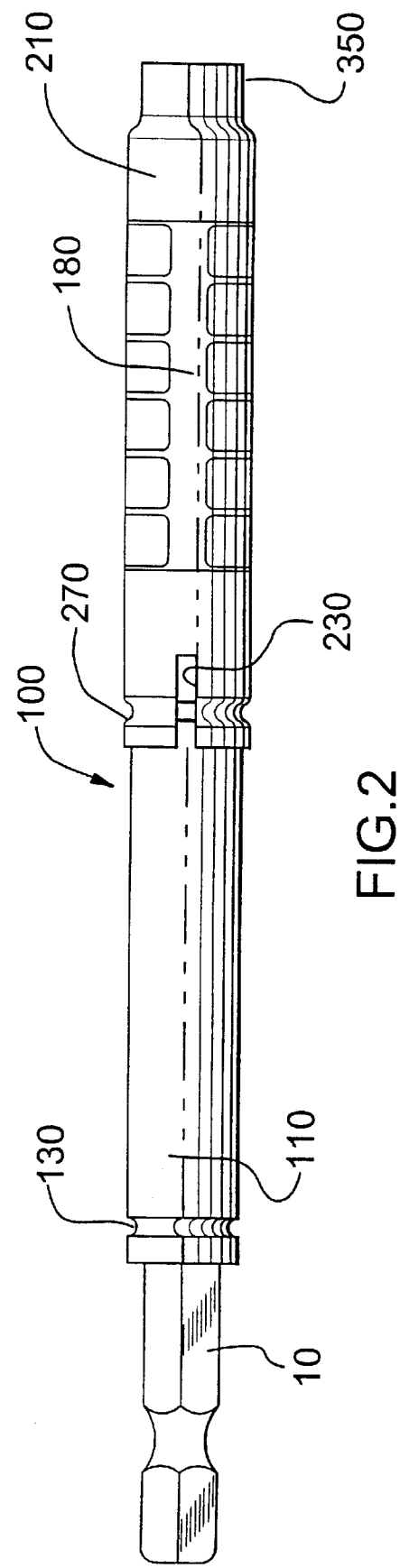
FIG.1
FIG.2

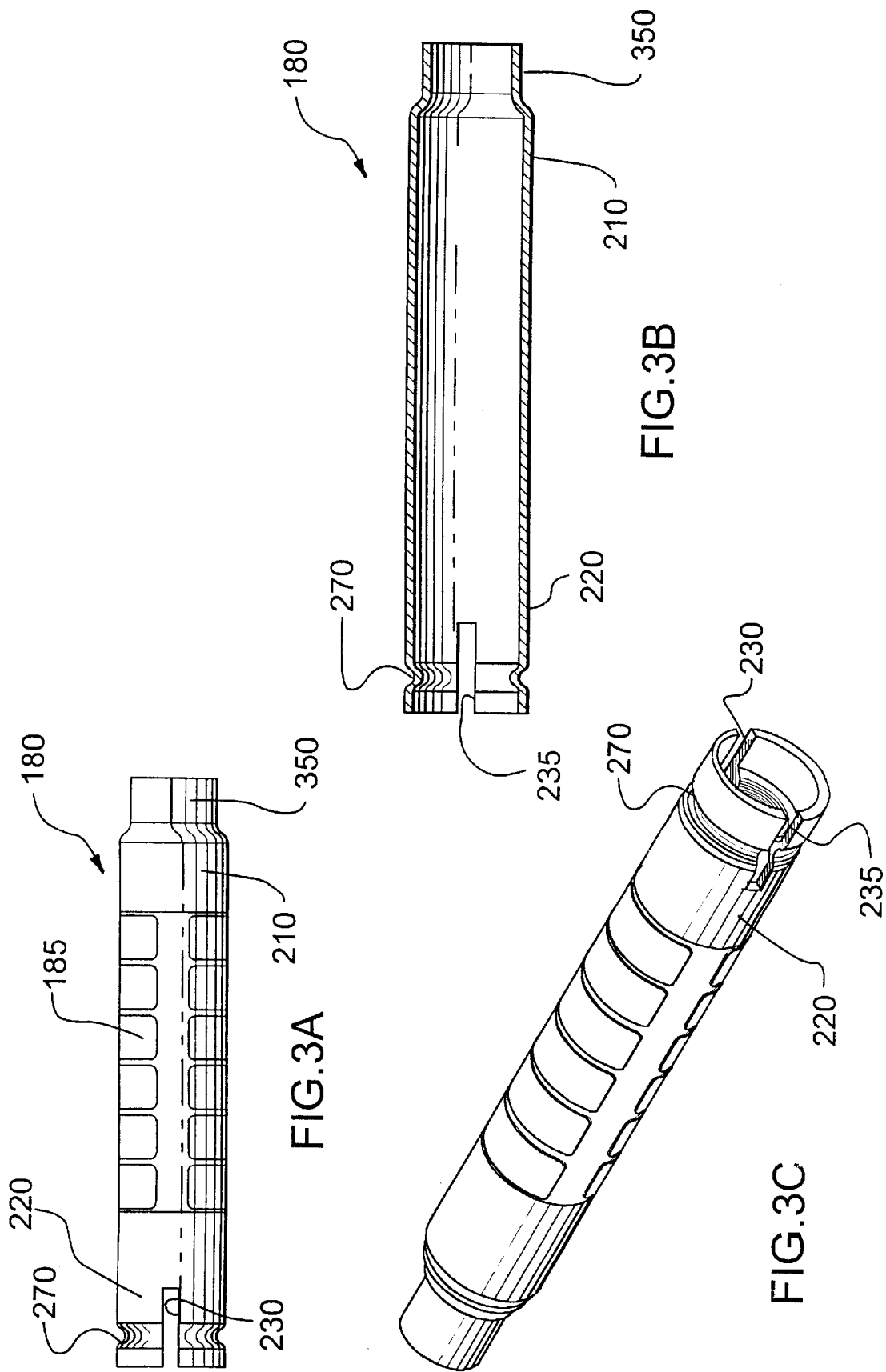

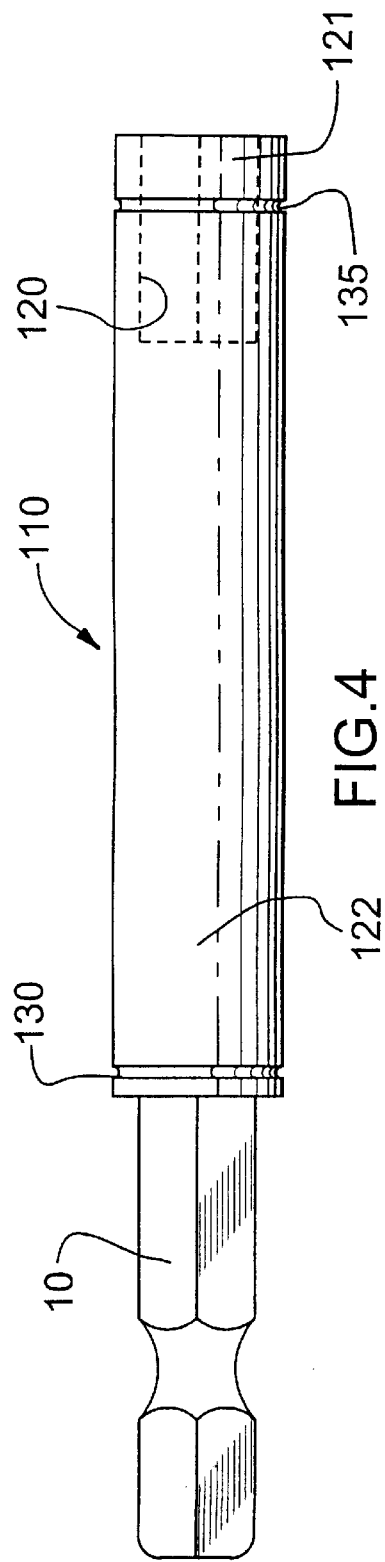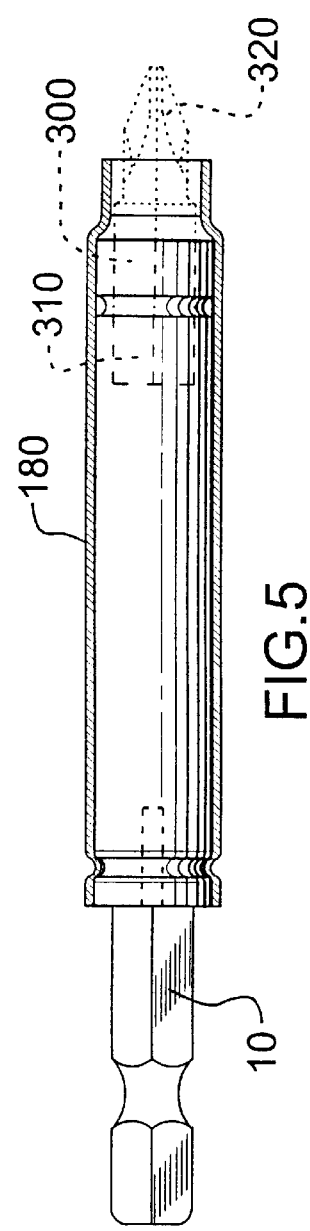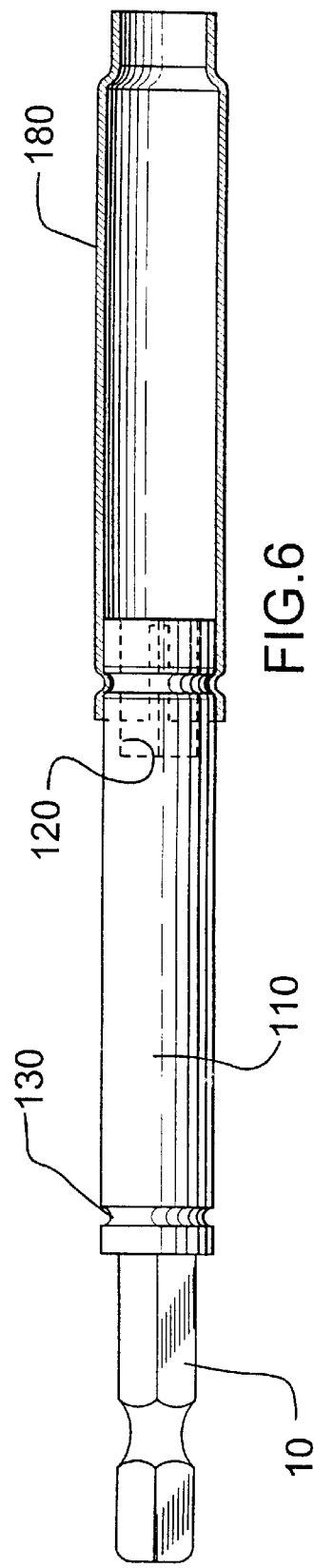

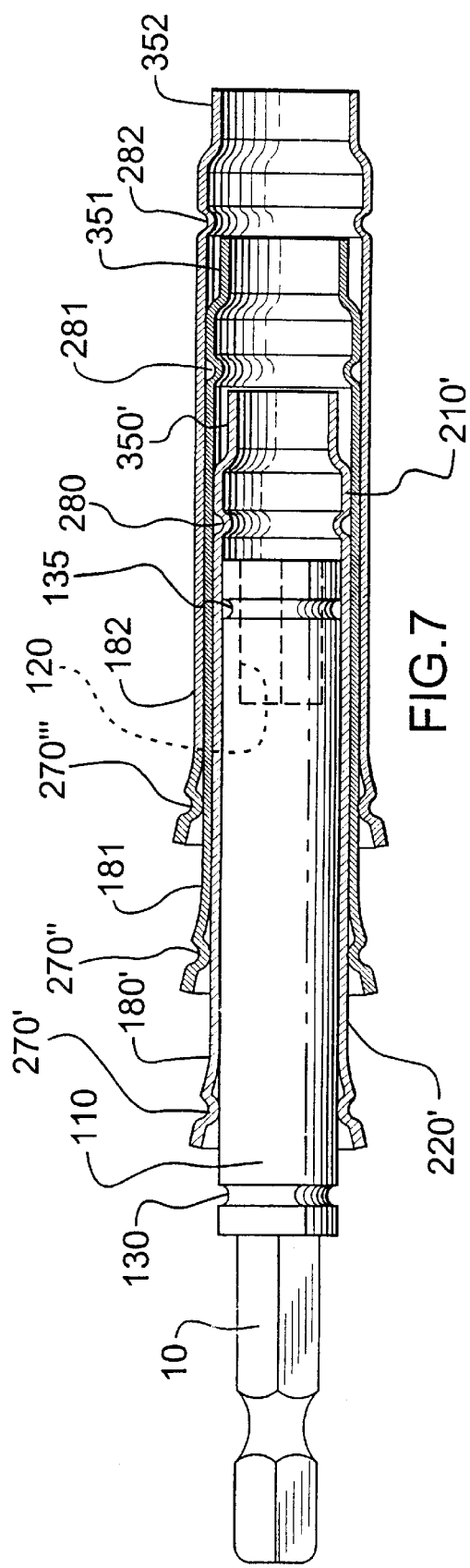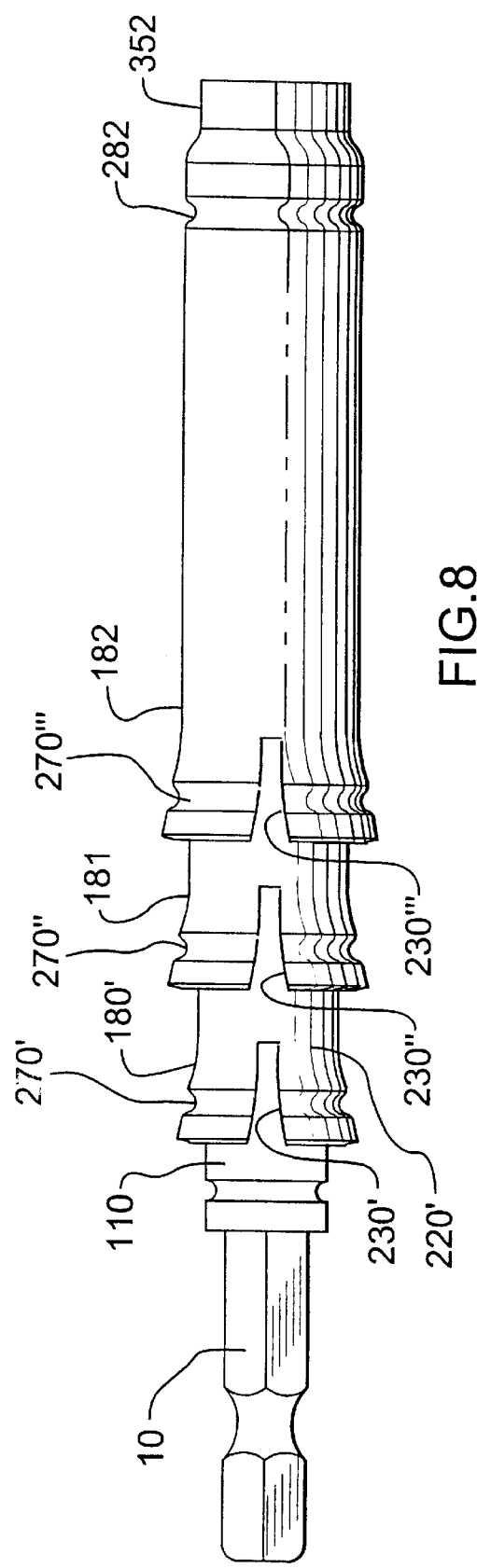

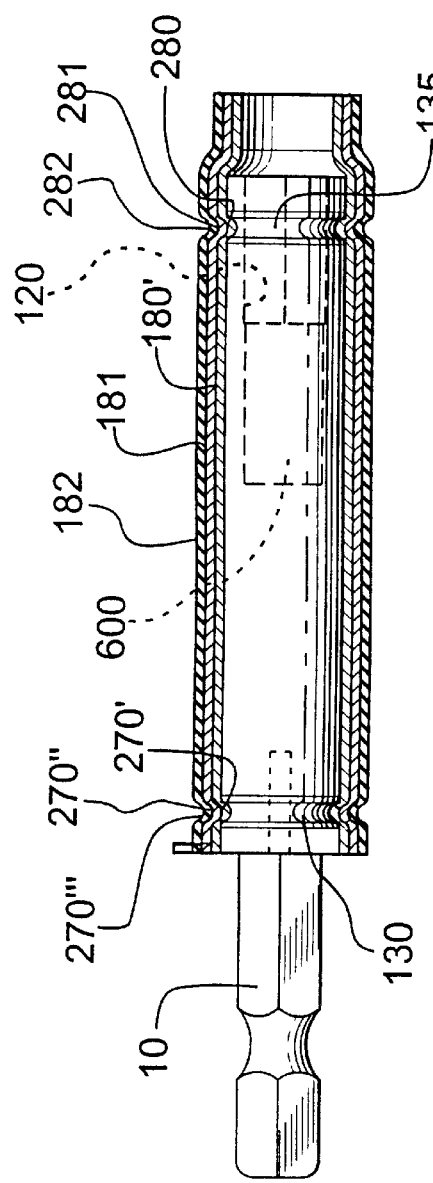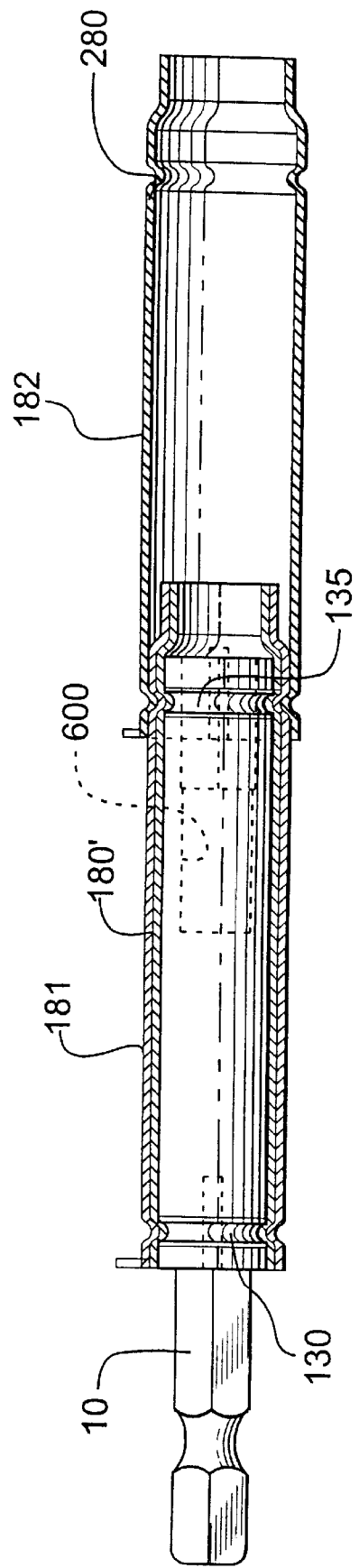

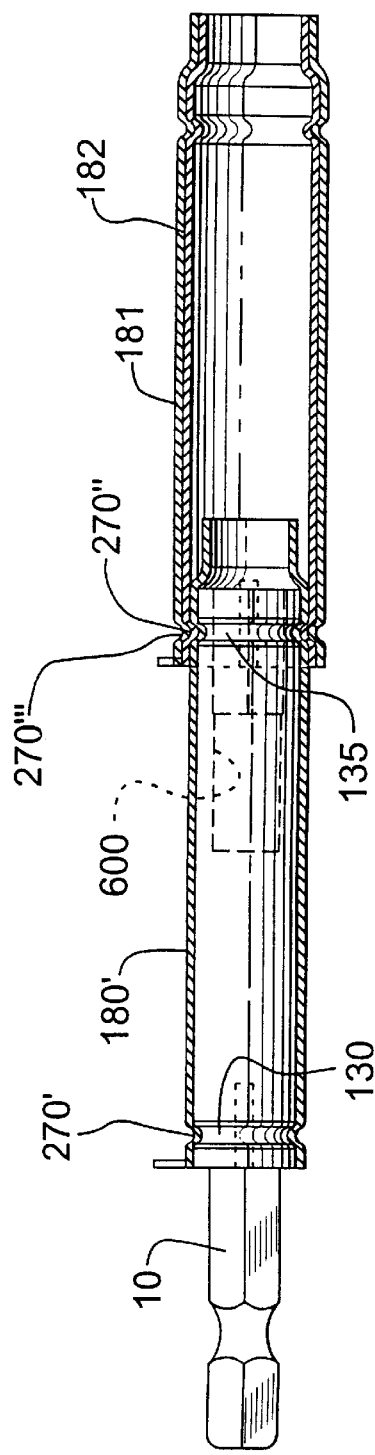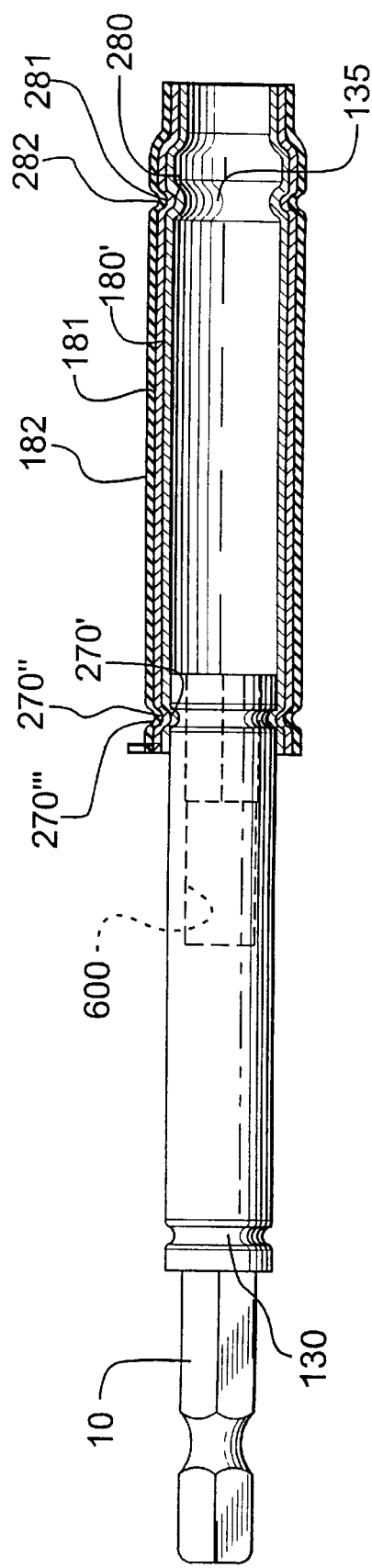

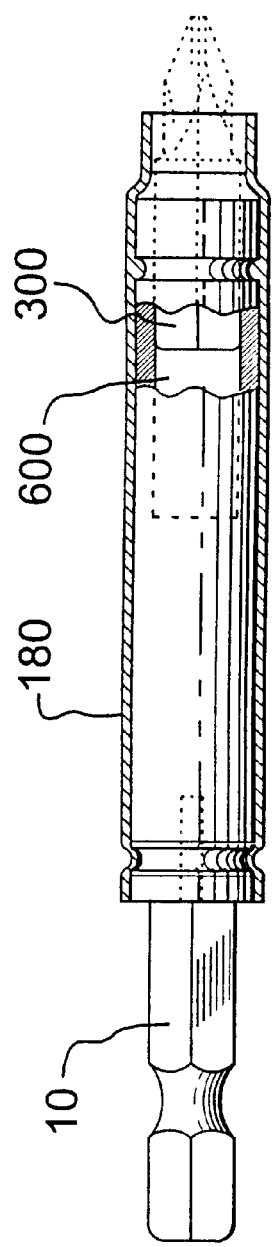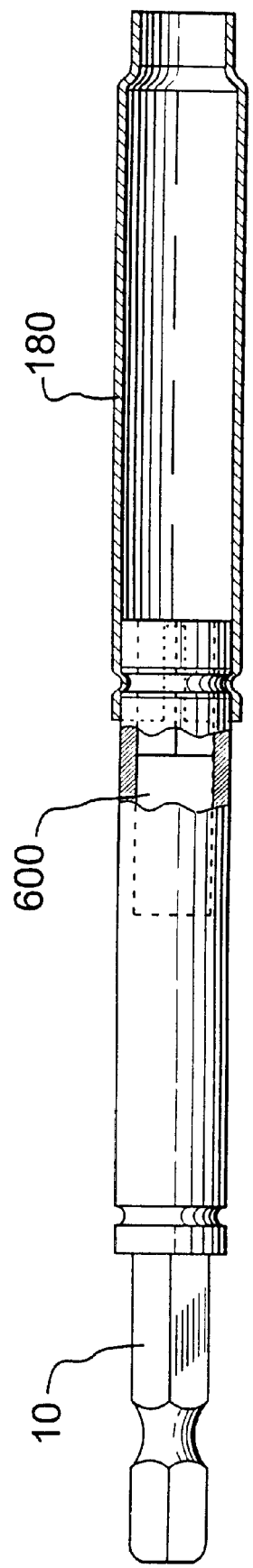

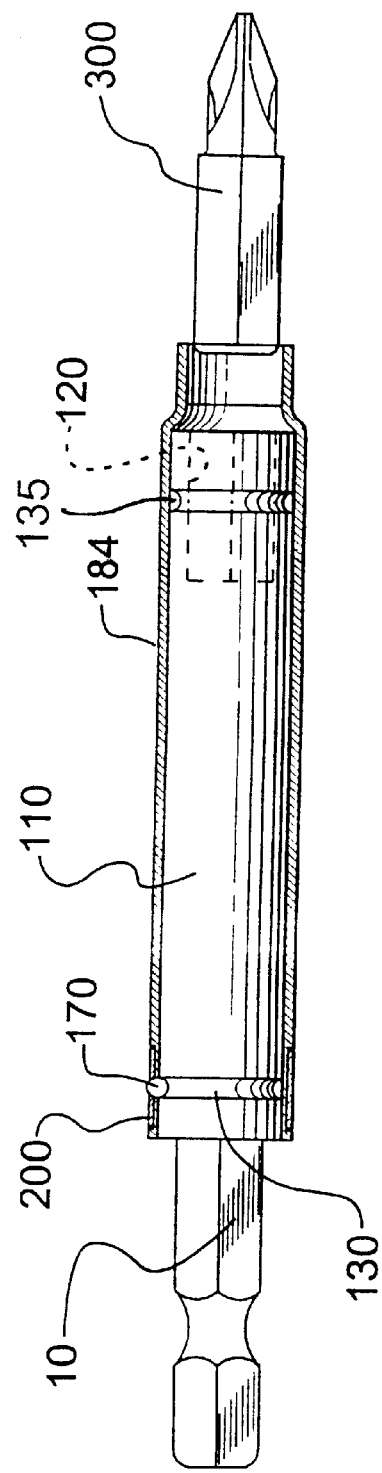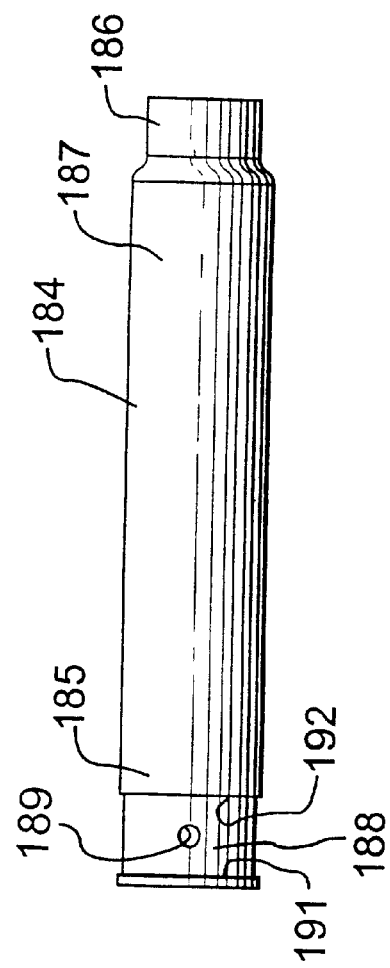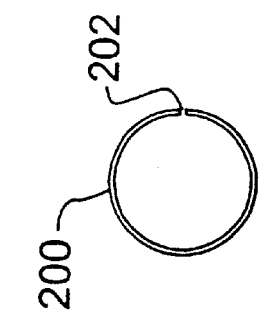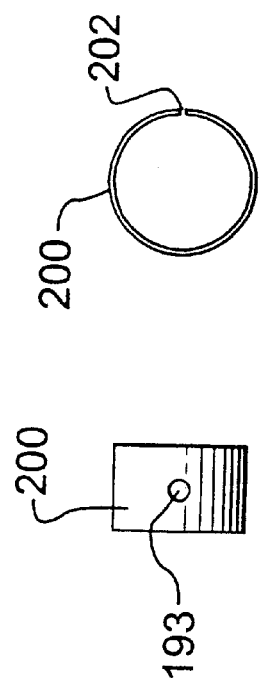
FIG.21
FIG.22A
FIG.23A  FIG.23B

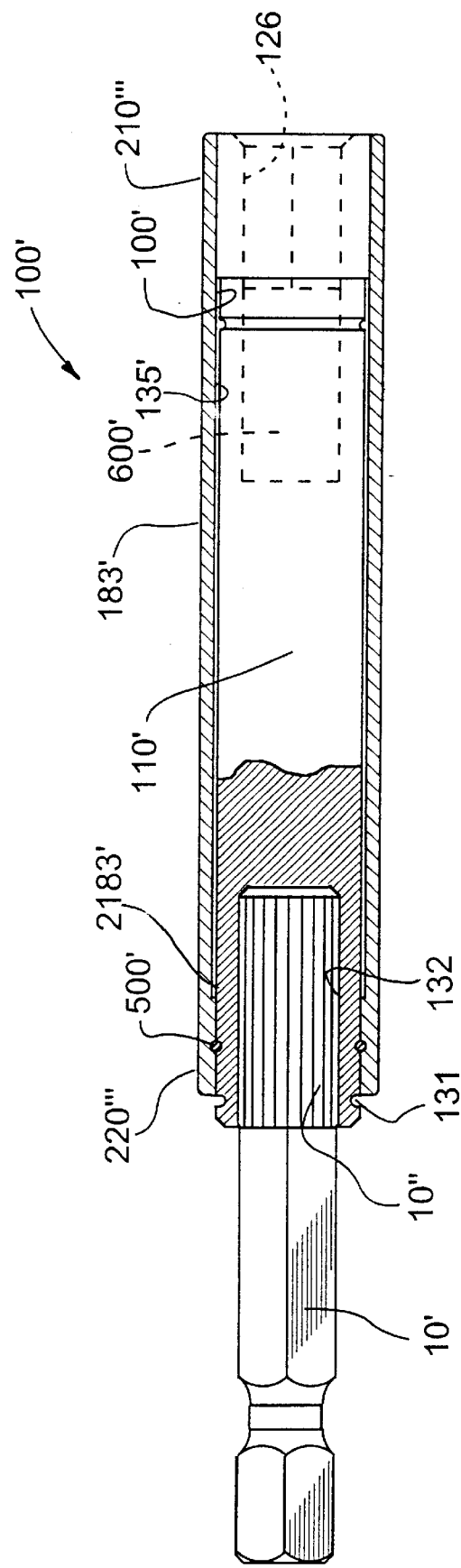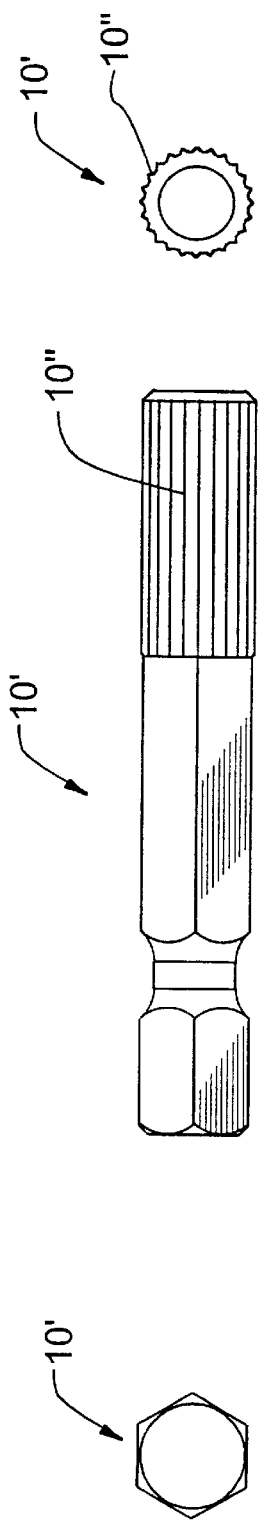
FIG. 29
FIG. 30A
FIG. 30B
FIG. 30C

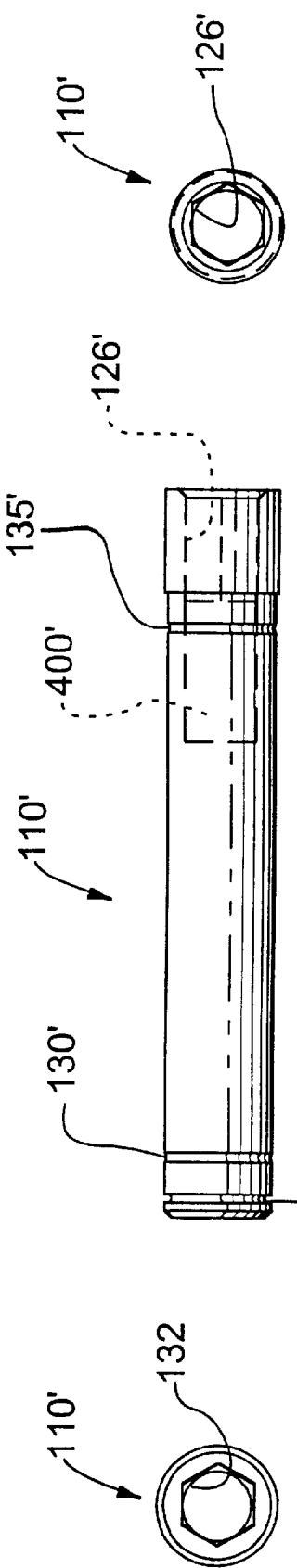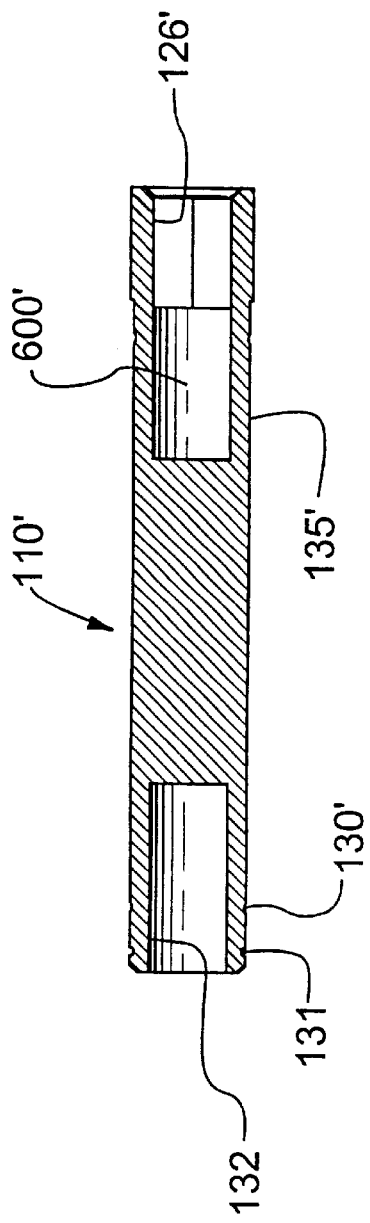

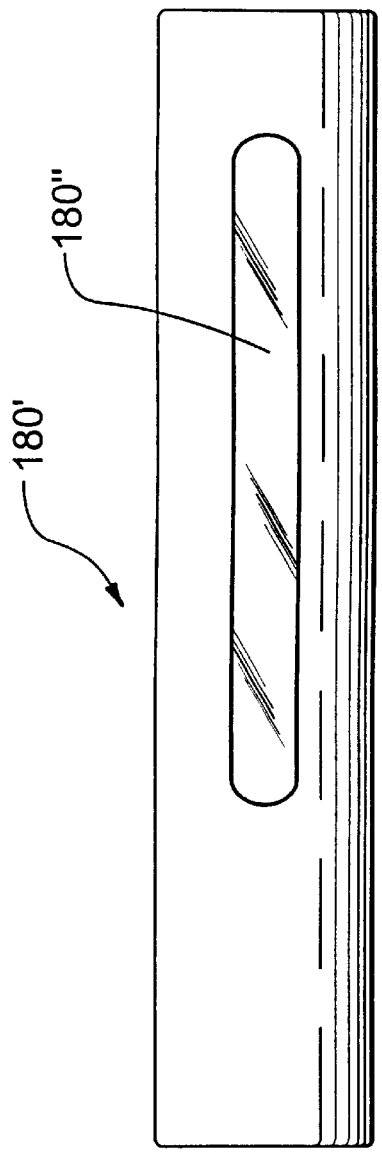
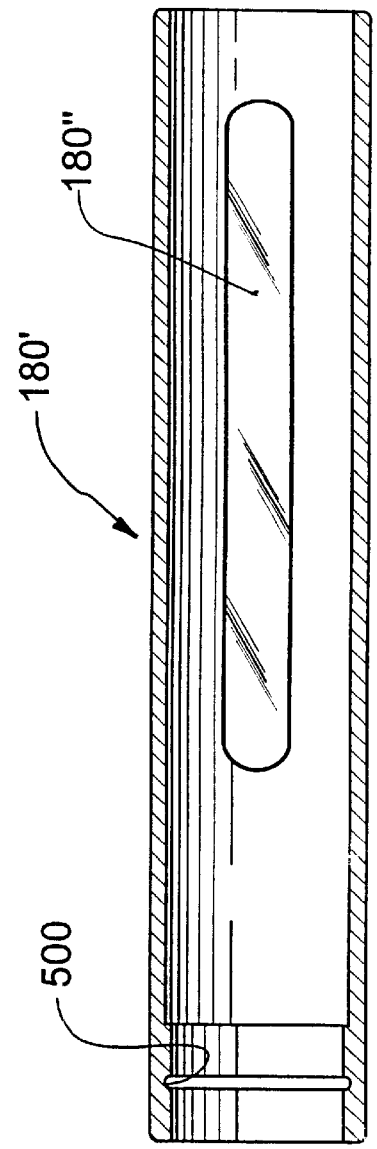
FIG.35A
FIG.35B

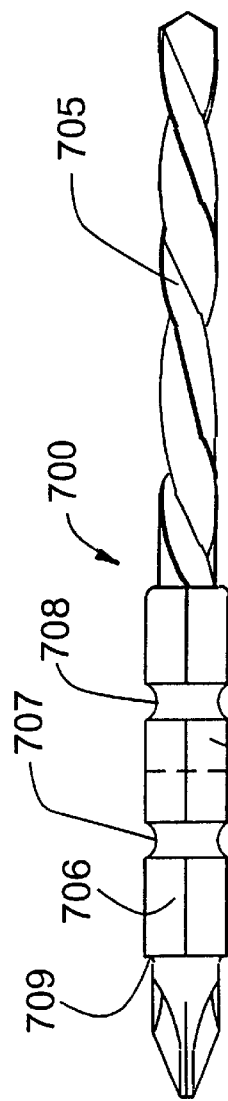
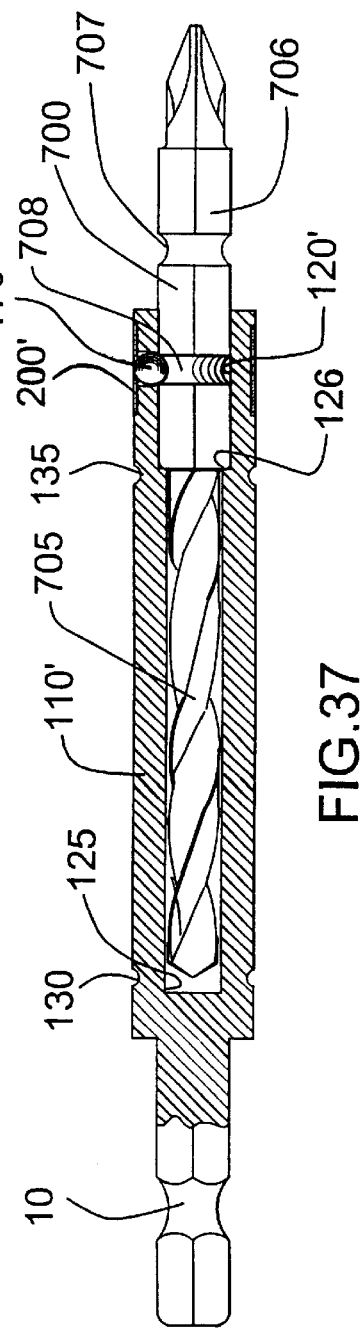
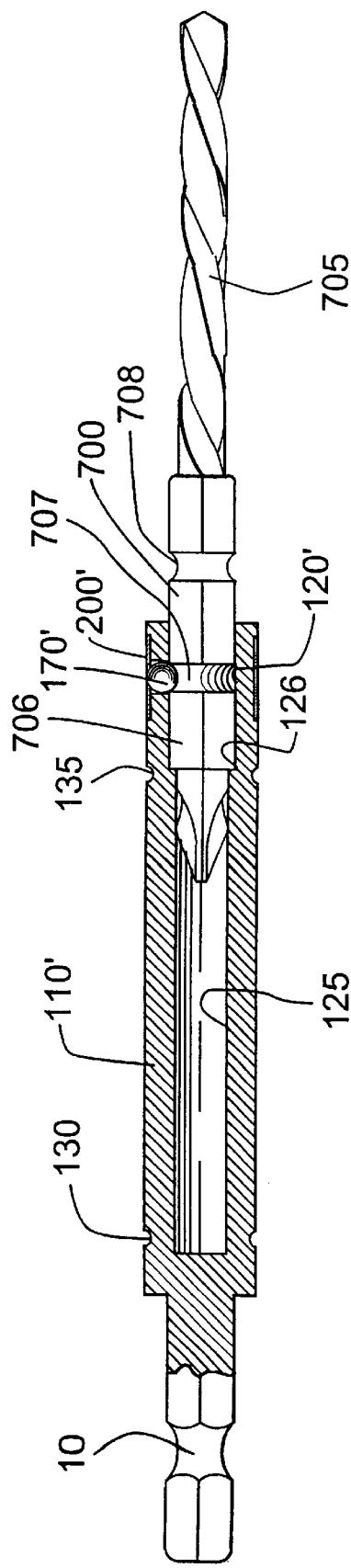
FIG.36
FIG.37
FIG.38

SCREW GUIDE DEVICE WITH DRILL BIT/ SCREW BIT AND COUNTER SINK/DRILL STOP MEANS

CROSS-REFERENCE TO RELATED APPLICATION

This application claims the benefit of priority from Provisional Application No. 60/148,589, filed Aug. 13, 1999.

BACKGROUND OF THE INVENTION

This invention relates to a screw guide device for laterally holding a screw or the like during the actual driving operation, especially for use in hand tools having bit holders and exchangeable tool bits. The device further incorporates reversible drill bit/screw bit means and counter sink/drill stop means.

SUMMARY OF THE INVENTION

It is an object of the present invention to provide a holder for a tool bit for laterally stablizing a screw applied to the tool bit having one or more outer sleeves for holding a variety of different diameter screws arranged to reciprocally slide over the first sleeve between first end positions and second end positions.

Accordingly, there is provided in one embodiment of the invention, a holder for a tool bit for laterally stabilizing a screw applied to the tool bit including an elongated connector means having a first end and a second end, wherein the elongated connector means has a central longitudinal hole of a cross-section corresponding to the cross-section of a mounting portion of the tool bit, at the first end, and a tool mount at the second end, and wherein the elongated connector means has a first circumferential groove adjacent the second end and a second circumferential groove adjacent the first end, a first sleeve arranged to reciprocally slide over the connector means between a first end position and a second end position, wherein the first sleeve has a first end remote from the tool mount and a second end nearer the tool mount, wherein the first sleeve has an inward facing annular ridge arranged at the second end of the first sleeve. so that the annular ridge is seated in the first circumferential groove when the sleeve is in the first end position, and the annular ridge is seated in the second circumferential groove when the sleeve is in the second end position, and wherein the holder further includes one or more outer sleeves for holding a variety of different diameter screws arranged to reciprocally slide over the first sleeve between first end positions and second end positions.

In a preferred embodiment, each of the sleeves of the holder has one or more longitudinal slits arranged at the second end of the sleeve to provide resilience to the second end of the sleeve.

In another preferred embodiment the connector means is provided with a tool bit retaining means adjacent the first end. The tool bit retaining means may be a magnet, for example. Alternatively, the tool bit retaining means may comprise a recess arranged on the outer surface of the connector means adjacent the second end, a substantially cylindrical collar slidingly movable in the recess, the collar having an axial slit running the entire length of the collar, the recess further having a radial hole and the collar also having a radial hole, arranged to cooperate with a locking ball, so that the locking ball protrudes a sufficient amount through the radial hole of the recess, when the holder is assembled, to serve as a stop in a corresponding groove in a tool bit, or similar, to hold the tool bit in place after insertion into the connector means.

In a yet another preferred embodiment, one or more sleeves for holding different diameter screws are Identified by providing tabs on the one or more sleeves.

In a yet another preferred embodiment the holder has means on the connector means for preventing retraction of the first sleeve substantially beyond the first position, the means for preventing retraction preferably being a retention ring positioned in a groove around the connector means.

There is provided, according to another embodiment, a holder for a tool bit for laterally stabilizing a screw applied to the tool bit including an elongated connector means having a first end and a second end, wherein the elongated connector means has a central longitudinal hole of a cross-section corresponding to the cross-section of a mounting portion of the tool bit, at the first end, and a tool mount at the second end, and wherein the elongated connector means has a first circumferential groove adjacent the second end and a second circumferential groove adjacent the first end, a first sleeve arranged to reciprocally slide over the connector means between a first end position and a second end position, wherein the first sleeve has a first end remote from the tool mount and a second end nearer the tool mount, and wherein the holder further includes one or more outer sleeves for holding a variety of different diameter screws arranged to reciprocally slide over the first sleeve between first end positions and second end positions, and wherein the first sleeve has a recess arranged at the second end, the recess having a first step, adjacent the second end, and a second step, facing away from the second end, the steps and the surface of the recess defining a substantially tubular space in which a substantially cylindrical collar is slidingly arranged, the collar having an axial slit running the entire length of the collar, the recess further having a radial hole and the collar also having a radial hole, arranged to cooperate with a locking ball, the locking ball protruding a sufficient amount through the radial hole of the recess, when the holder is assembled, to serve as a stop for the first sleeve in either the first circumferential groove or the second circumferential groove.

In a preferred embodiment, each of the sleeves of the holder has one or more longitudinal slits arranged at the second end of the sleeve to provide resilience to the second end of the sleeve.

BRIEF DESCRIPTION OF THE DRAWINGS

In order that the invention may be more clearly understood, the preferred embodiment thereof will now be described in detail by way of example, with reference to the accompanying drawings, in which:

FIG. 1 is a side view of a device according to a first embodiment of the invention, showing the device with the sleeve in its retracted position;

FIG. 2 is a side view of a device according to the first embodiment of the invention, showing the device with the sleeve in its extended position;

FIG. 3A is a side view of a sleeve according to the first embodiment of the invention, FIG. 3B is a sectional side view of the sleeve according to FIG. 3A;

FIG. 3C is a perspective side view of a sleeve according to the first embodiment of the invention, FIG. 4 is a side view of a connector according to the first embodiment of the invention;

FIG. 5 is a sectional side view of the device according to the first embodiment of the invention, showing the device with the sleeve in its retracted position;

FIG. 6 is a side view of a device according to the first embodiment of the invention, showing the device with the sleeve in its extended position;

FIG. 7 is a sectional side view of a device according to a second embodiment of the invention, showing the multiple sleeves in intermediate positions;

FIG. 8 is a side view of the device according to FIG. 7;

FIG. 13 is a sectional side view of the device according to the second embodiment of the invention, showing the device in a position where all sleeves are in their retracted positions;

FIG. 14 is a sectional side view of the device according to the second embodiment of the invention, showing the device in a position where the third sleeve is in its extended position and the other sleeves are in their retracted positions;

FIG. 15 is a sectional side view of the device according to the second embodiment of the invention, showing the device in a position where the third sleeve and the second sleeve are in their extended positions and the first sleeve is in its retracted position;

FIG. 16 is a sectional side view of the device according to the second embodiment of the invention, showing the device in a position where all sleeves are in their extended positions;

FIG. 19 is a sectional side view of a device according to a fourth embodiment of the invention, showing the sleeve in its retracted position;

FIG. 20 is a sectional side view of the device according to FIG. 19, showing the sleeve in its extracted position;

FIG. 21 is a sectional side view of a device according to a fifth embodiment of the invention, showing the sleeve in its retracted position;

FIG. 22A is a side view of a sleeve according to the sixth embodiment of the invention;

FIG. 23A is a side view of a collar according to the fifth embodiment of the invention, seen from the radial hole;

FIG. 29 is a partly sectional side view of a device according to a seventh embodiment of the invention, showing the sleeve in its extended position;

FIG. 30C is an end view of the removable hex shaft tool mount of FIG. 30A, seen from the connector side;

FIG. 31A is a side view of a connector according to the seventh embodiment of the invention;

FIG. 31B is a sectioned side view of the connector of FIG. 31A;

FIG. 31C is an end view of the connector of FIG. 31A, seen from the side of the hex shaft mounting side;

FIG. 31D is an end view of the connector of FIG. 31A, seen from the side of the bit mounting side;

FIG. 35A is a side view of a sleeve according to the eighth embodiment of the invention;

FIG. 35B is a sectional side view of the sleeve of FIG. 35A;

FIG. 36 is a side view of a reversible drill bit/screw bit according to a ninth embodiment of the invention;

FIG. 37 is a sectional side view of the device shown in FIG. 36, showing a reversible drill bitscrew bit inserted instead of the single screw bit and having the drill bit portion is inserted; and FIG. 38 is a sectional side view of the device shown in FIG. 37, showing a reversible drill bit/screw bit inserted instead of the single screw bit and having the screw bit portion is inserted.

DETAILED DESCRIPTION

Figure 9A:
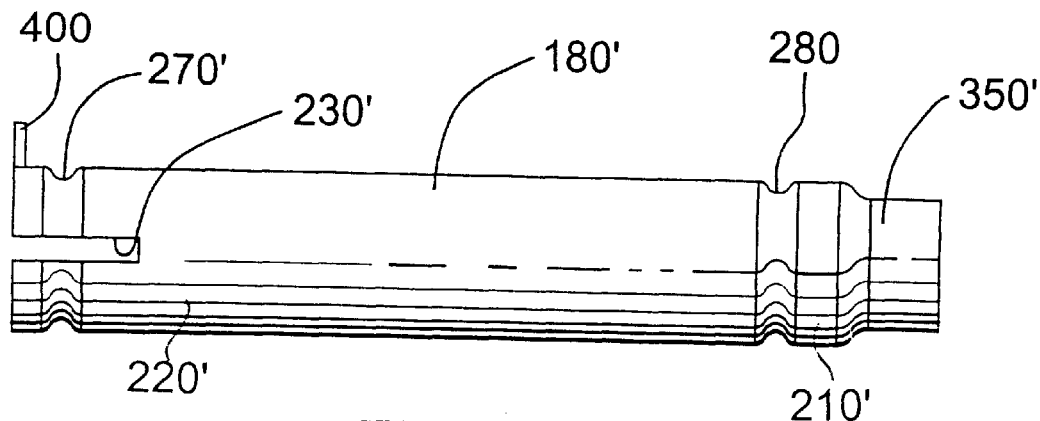
FIG. 9A is a side view of a first sleeve according to the second embodiment of the invention.
Figure 9B:
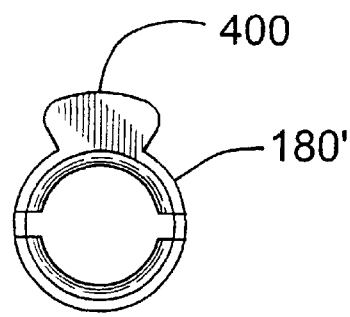
FIG. 9B is a frontal view of the first sleeve according to FIG. 9A, seen from the tab end of the sleeve.
Figure 9C:
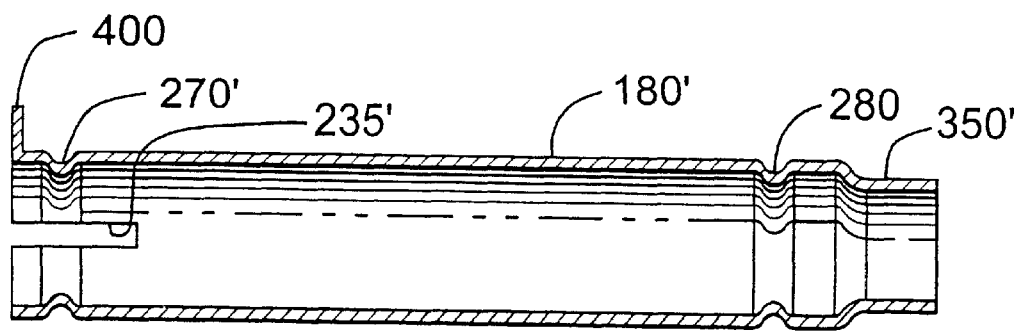
FIG. 9C is a sectional side view of the first sleeve according to FIG. 9A.
Figure 10A:
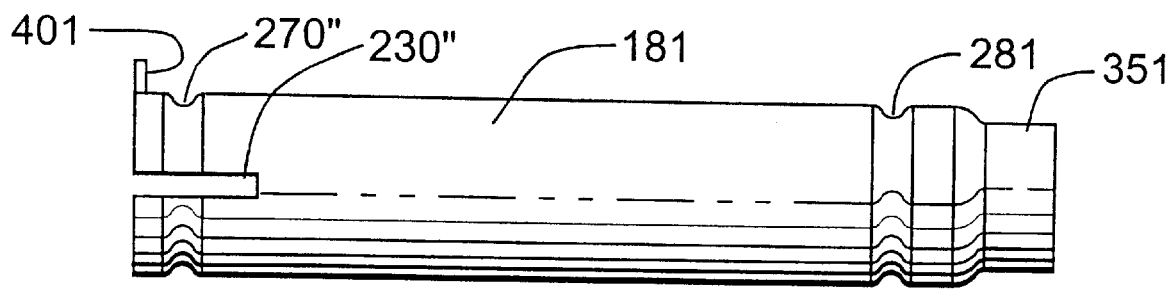
FIG. 10A is a side view of a second sleeve according to the second embodiment of the invention.
Figure 10B:
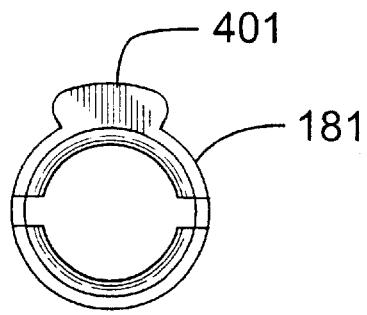
FIG. 10B is a frontal view of the second sleeve according to FIG. 10A, seen from the tab end of the sleeve.
Figure 10C:
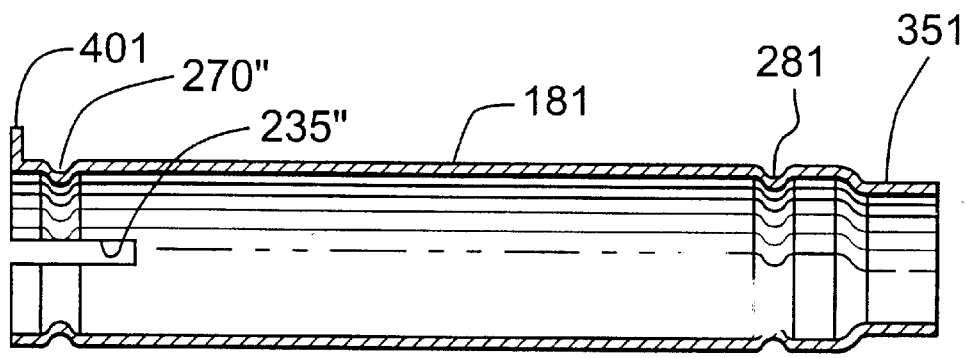
FIG. 10C is a sectional side view of the second according to FIG. 10A.
Figure 11A:
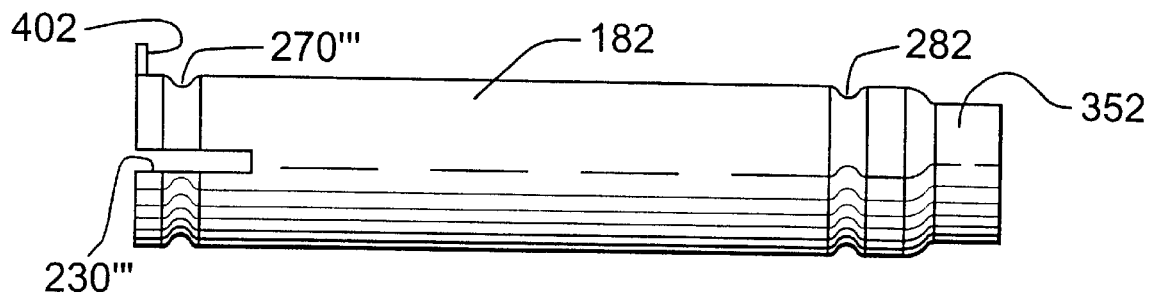
FIG. 11A is a side view of a third sleeve according to the second embodiment of the invention.
Figure 11B:
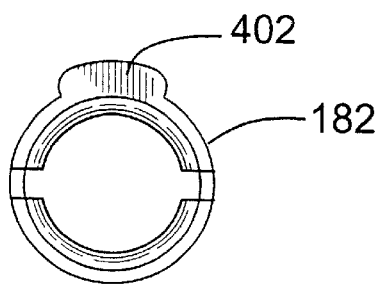
FIG. 11B is a frontal view of the third sleeve according to FIG. 11A, seen from the tab end of the sleeve.
Figure 11C:
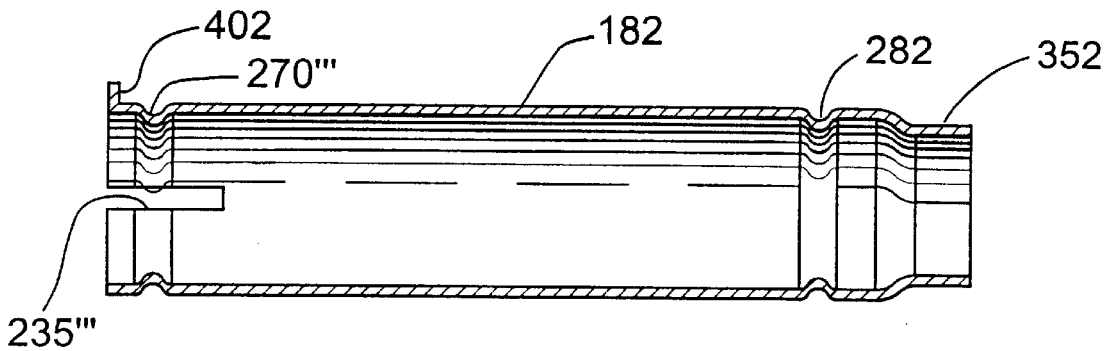
FIG. 11C is a sectional side view of the third sleeve according to FIG. 11A.

A first embodiment of a screw guide device according to the invention is shown in FIGS. 1 to 6, where a holder 100, for example mounted on a hand tool (not shown) for securely holding any one of a plurality of exchangeable tool bits 300 (see FIG. 5), comprises an elongated connector 110 (see FIG. 4) and a sleeve 180 (see FIGS. 3A to 3C). The sleeve is preferably provided with a grip enhancing means 185 on its outer surface, for example a pattern arranged in the sleeve material or a coating applied on top of the sleeve material.

The connector 110 connects a tool bit to the hand tool and is provided with a central longitudinal hole 120 (see FIG. 4) at a first end 121 and a tool mount 10 at a second end 122. The connector means is attachable to a hand tool (not shown) via the tool mount 10. The longitudinal hole has a cross-section corresponding to the cross-section of a mounting portion 310 (see FIG. 5) of the tool bit 300. The mounting portion of the tool bit may thus be inserted into the longitudinal hole 120 of the connector means. The tool bit further has a profiled working portion 320 opposite the mounting portion. The connector means includes a first circumferential groove 130, arranged adjacent the second end 122 of the connector means, and a second circumferential groove 135, arranged adjacent the first end 121 of the connector means.

The sleeve 480 is arranged to reciprocally slide over the connector 110 between two end positions. The sleeve has a first end 210 facing the tool bit 300 and a second end 220 facing the tool mount 10. At the second end 220 of the sleeve, an annular ridge 270 is arranged facing inwards, to cooperate with either the first circumferential groove 130 or the second circumferential groove 135, to hold the first sleeve 180 in a secured position relative to the connector 110. At the first end 210 of the sleeve, a smaller diameter section 350 is formed. The smaller diameter section has a diameter which is smaller than the outer diameter of the connector 110. In order to provide the necessary resilience to the second end 220 of the sleeve 180, a first longitudinal slit 230 and a second longitudinal slit 235, diametrically opposed to the slit 230, are arranged at the second end. The first and second slits 230, 235 extend approximately one sleeve diameter from the second end 220 into the sleeve, and at least past the annular ridge 270. The second end 220 is thus allowed to bend outwards slightly when the sleeve 180 is moved from a first position of the sleeve, where the annular ridge 270 is seated in the first circumferential groove 130, to a second position, where the first annular ridge is seated in the second circumferential groove 135. Alternatively, only one silt may be used, if the necessary resilience of the second end 220 is obtained by this measure.

The holder 100 is used as a regular tool extension for tool bits 300 when the sleeve 180 is in its retracted position, i.e. the sleeve is in a position where the annular ridge 270 is engaged in the first circumferential groove 130. This is also the preferred location of the sleeve for storing the holder. When the user of the holder wishes to securely hold a screw laterally, the user first places the screw head against the profiled working portion 320 of the tool bit and then extends the sleeve 180 around the screw, i.e. the sleeve is in a position where the annular ridge 270 is engaged in the second circumferential groove 135.

In FIGS. 7 to 16, a second embodiment of the invention is shown, where a first sleeve 180' (see FIGS. 9A to 9C), structurally similar to the sleeve 180, but without the grip enhancing means, is surrounded by one or more outer sleeves to provide lateral screw holding capabilities for a variety of different diameter screws. In the shown preferred embodiment, a second sleeve 181 (see FIGS. 10A to 10C) and a third sleeve 182 (see FIGS. 11A to 11C) are used, bringing the total number of sleeves to three, but any feasible total number of sleeves may be used, for example two or four. Each sleeve has the same general shape of a substantially cylindrical sleeve having a smaller diameter portion 350', 351, 352, respectively at the end of the sleeve which faces the tool bit. Each sleeve has a maximum diameter and small diameter adapted to accommodate a certain range of screw sizes.

Preferably, in order to facilitate the sliding of one sleeve relative to the other sleeves, only the outermost sleeve has a grip enhancing means, as specified above. In the shown embodiment the third sleeve 182 would have the gripping means.

Figure 12:
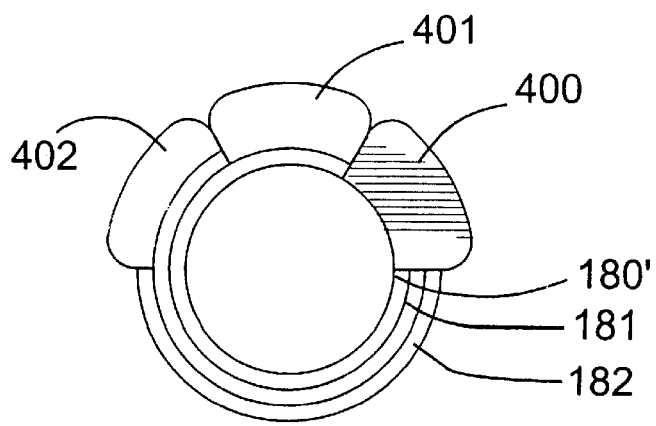
FIG. 12 is a frontal view of the sleeves according to the second embodiment of the invention, showing the sleeves in their relative positions in use on the device according to the second embodiment of the invention, and seen from the tab ends of the sleeves.

As is shown in FIGS. 9A to 11C, a tab is preferably arranged at the end of each sleeve which end is distal from the smaller diameter portion of each sleeve. The first sleeve 180' has a tab 400, the second sleeve 181 has a tab 401 and the third sleeve has a tab 402. Preferably, each tab is provided with markings (not shown) showing the intended screw size range for the particular sleeve, on either side or both sides of the tab. The sleeves, when nested together, will be arranged as is shown in FIG. 12. Each sleeve is rotated a certain angle relative to the neighboring sleeve, so that all tab markings are visible from the each end of the holder.

Similar to the functional cooperation between the sleeve 180 and the connector 110 in the first embodiment described above, the first sleeve 180' is arranged to reciprocally slide over the connector 110 between two end positions. The first sleeve has a first end 210' facing the tool bit and a second end 220' facing the tool mount 10. At the second end 220' of the sleeve, a first annular ridge 270' is arranged facing inwards, to cooperate with either the first circumferential groove 130 or the second circumferential groove 135, to hold the sleeve 180' in a secured position relative to the connector 110. The annular ridge 270' is formed in the sleeve to provide a corresponding indentation on the side of the sleeve opposite the ridge itself. Al the first end 210' of the sleeve 180', the smaller diameter section 350' is formed. The smaller diameter section has a diameter which is smaller than the outer diameter of the connector 110. In order to provide the necessary resilience to the second end 220' of the sleeve 180', a first longitudinal slit 230' and a second longitudinal slit 235', diametrically opposed to the slit 230', are arranged at the end 220'. The slits 230', 235' extend approximately one sleeve diameter from the end 220' into the sleeve, and at least past the annular ridge 270'. The end 220' is thus allowed to bend outwards slightly when the sleeve 180' is moved from a first position, where the annular ridge 270' is seated in the first circumferential groove 130, to a second position, where the annular ridge 270' is seated in the second circumferential groove 135. A second annular ridge 280 is arranged at the first end 210' of the sleeve 180', the function of which will be described later.

Similarly, the second sleeve 181 has a first annular ridge 270", a second annular ridge 281 and a first longitudinal slit 230" and a second longitudinal slit 235". The first annular ridge 270" cooperates with the outside of the annular ridge 270' of the first sleeve 180' and the outside of the first annular ridge 280 of the sleeve 180', to allow the second sleeve 181 to slide between two end positions.

Similarly, the third sleeve 182 has a first annular ridge 270'". a second annular ridge 282 and a first longitudinal slit 230'" and a second longitudinal slit 235'". The annular ridge 270'" cooperates with the outside of the first annular ridge 270" of the second sleeve 181 and the outside of the second annular ridge 281 of the second sleeve 181, to allow the sleeve 182 to slide between two end positions. The outermost sleeve, the third sleeve 182 in this embodiment, does not have to have the annular ridge 282, since no sleeve is arranged outside this sleeve. From a manufacturing point of view, It might be more economical to manufacture all sleeves with two annular ridges, one at each end. The sleeves may then be combined freely in any number from one single sleeve up to, for example, five concentrically arranged sleeves.

As is shown in FIG. 13, when the holder is used merely as a tool extension or is in storage, the first sleeve 180', the second sleeve 181 and the third sleeve 182 are all pushed together and arranged so that the annular ridge 270' is seated in the first circumferential groove 130, the annular ridge 270" is seated in the outside of the annular ridge 270' and the annular ridge 270''' is seated in the outside of the annular ridge 270". Similarly, the annular ridge 280, the annular ridge 281 and the annular ridge 282 are seated in each other, whilst the annular ridge 280 is seated in the circumferential groove 135. In FIG. 13, the option is outlined of arranging a magnet 600 in the connecting means 110, directly adjacent the longitudinal hole 120, to facilitate the retention of the tool bit in the longitudinal hole.

FIG. 14 shows the holder when the outermost sleeve, the third sleeve 182, is pulled to its outermost end position. The first sleeve 180' and the second sleeve 181 are in the same positions as shown previously for FIG. 13. The annular ridge 270''' of the third sleeve 182 is seated in the outside of the annular ridge 281.

FIG. 15 shows the holder when the second sleeve 181 and the third sleeve 182 are pulled to their outermost end positions. The first sleeve 180' is in the same positions as shown previously for FIG. 13. The annular ridge 210''' of the sleeve 182 is seated in the outside of the annular ridge 281 and the annular ridge 281 of the second sleeve is seated in the outside of the annular ridge 280.

FIG. 16 shows the holder when all sleeves are in their outermost positions. The annular ridge 270' of the first sleeve 180' is seated in the second circumferential groove 135. The annular ridge 270" is seated in the outside of the annular ridge 270' and the annular ridge 270''' is seated in the outside of the annular ridge 270". Similarly, the annular ridge 280, the annular ridge 281 and the annular ridge 282 are seated in each other.

Figure 17:
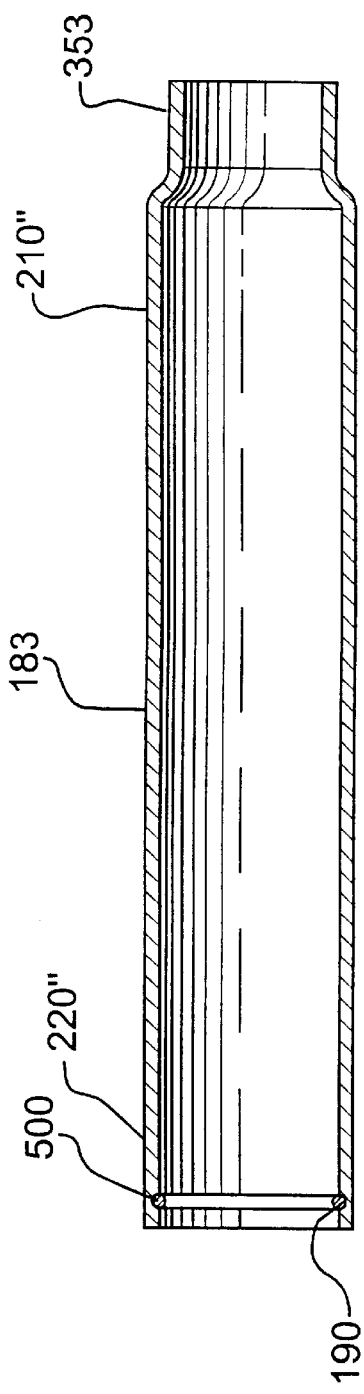
FIG. 17 is a sectional side view of a sleeve according to a third embodiment of the invention.
Figure 18:
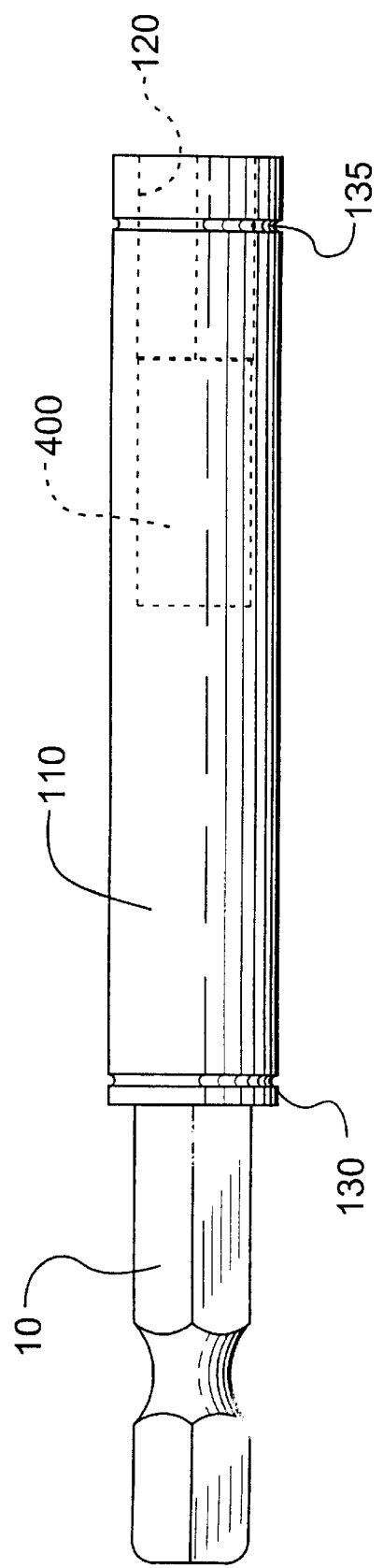
FIG. 18 is a side view of a connector means according to the third embodiment of the invention.
Figure 22B:
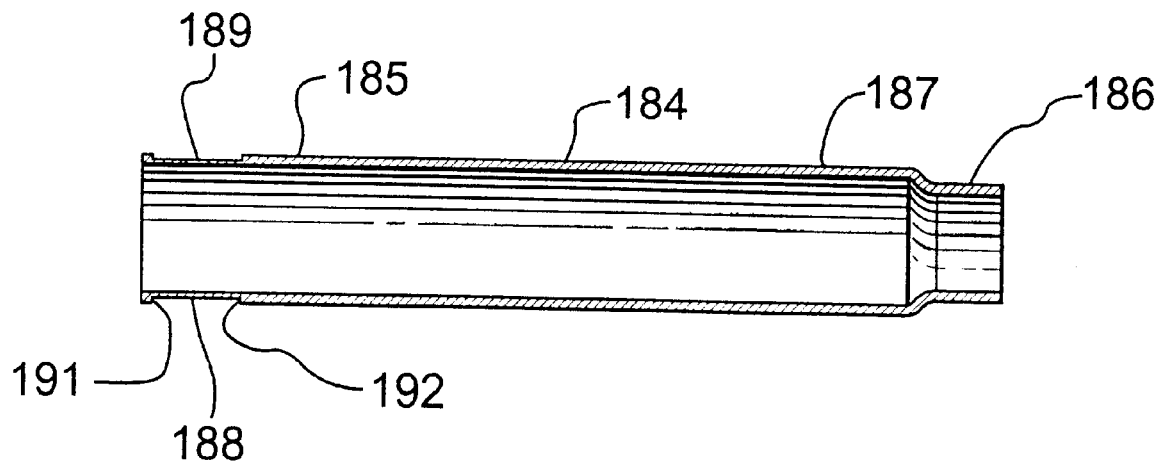
FIG. 22B is a sectional side view of the sleeve according to FIG. 22A.
Figure 24:
FIG. 24 is a side view of a partially assembled device according to the fifth embodiment of the invention, showing the collar and locking ball assembled onto the first sleeve.
Figure 25:
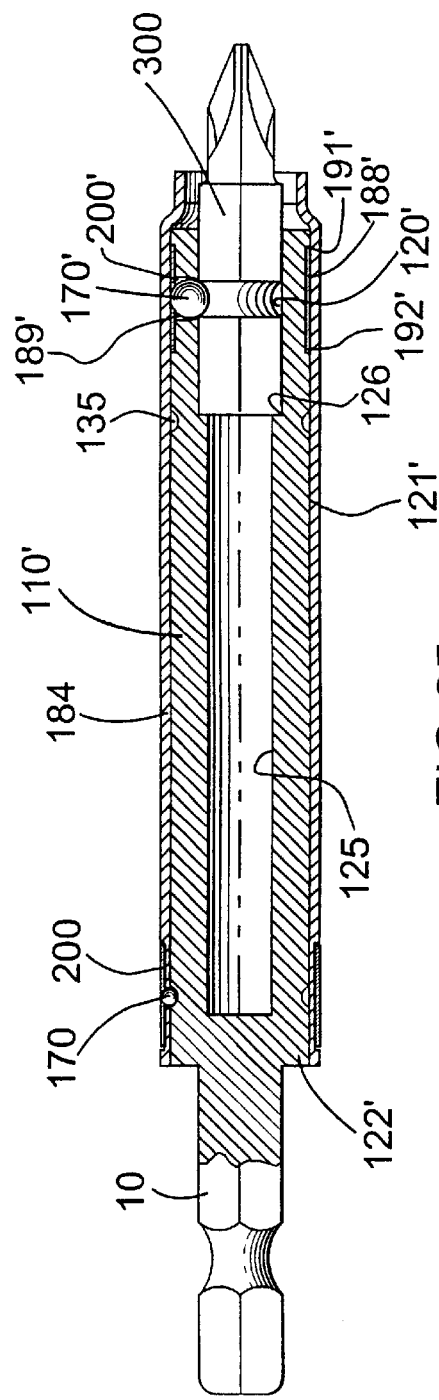
FIG. 25 is a sectional side view of a device according to a sixth embodiment of the invention, showing the sleeve in Its retracted position.
Figure 26:
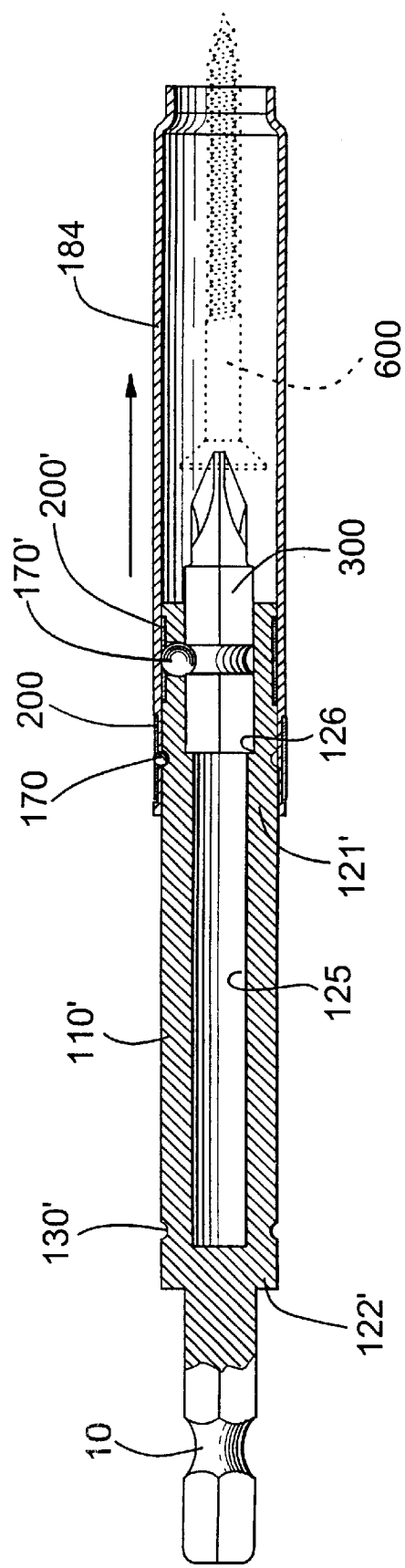
FIG. 26 is a sectional side view of the device according to FIG. 25, showing the sleeve in its extended position.
Figure 27:
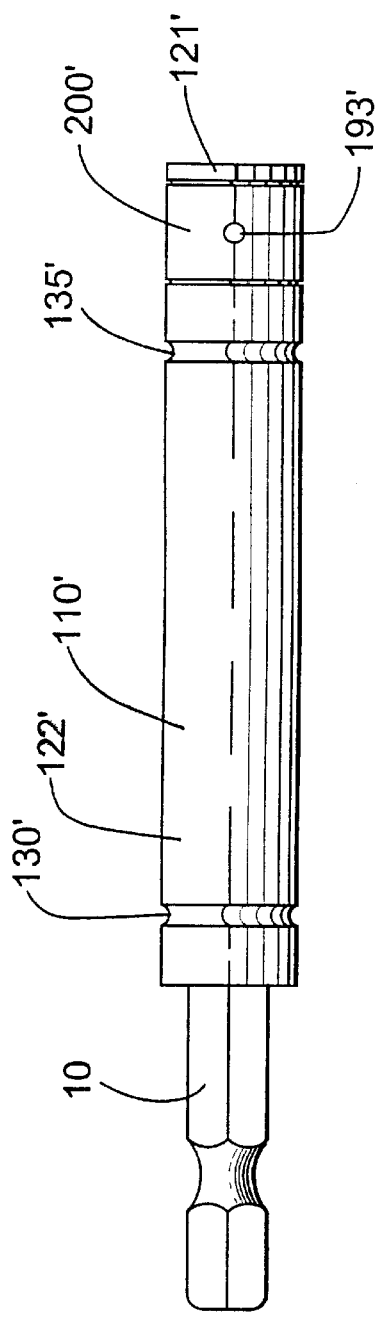
FIG. 27 is a sectional side view of a device according to the sixth embodiment of the invention, showing the elongated connector means.
Figure 28:
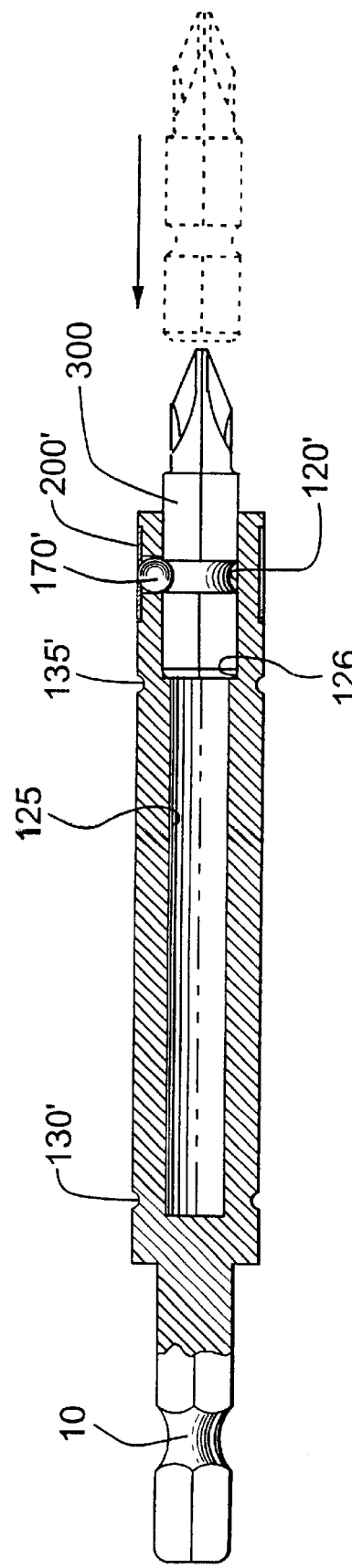
FIG. 28 is a sectional side view of the device shown in FIG. 27, showing the inserted single screw bit.
Figure 32A:
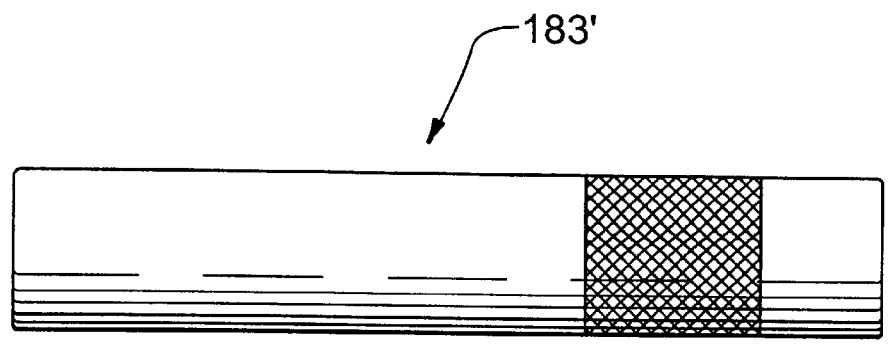
FIG. 32A is a side view of a sleeve according to the seventh embodiment of the invention.
Figure 32B:
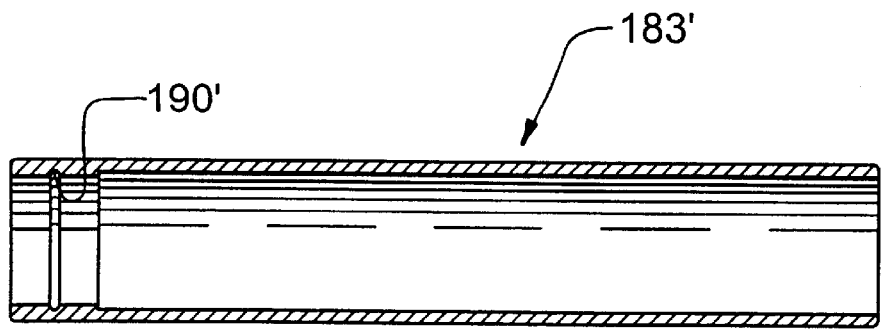
FIG. 32B is a sectioned side view of the sleeve of FIG. 32A.
Figures 33A, 33B:
FIG. 33A is a top view of a retaining ring according to the seventh embodiment of the invention.
FIG. 33B is a side view of the retaining ring of FIG. 33A.
Figure 34A:
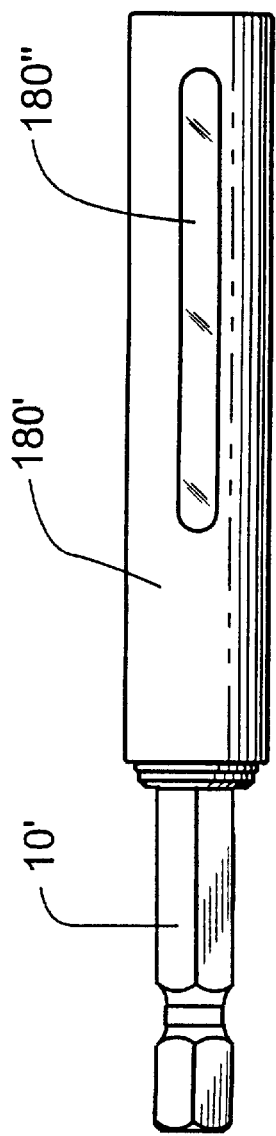
FIG. 34A is a side view of a device according to an eighth embodiment of the invention, showing the sleeve in its retracted position.
Figure 34B:
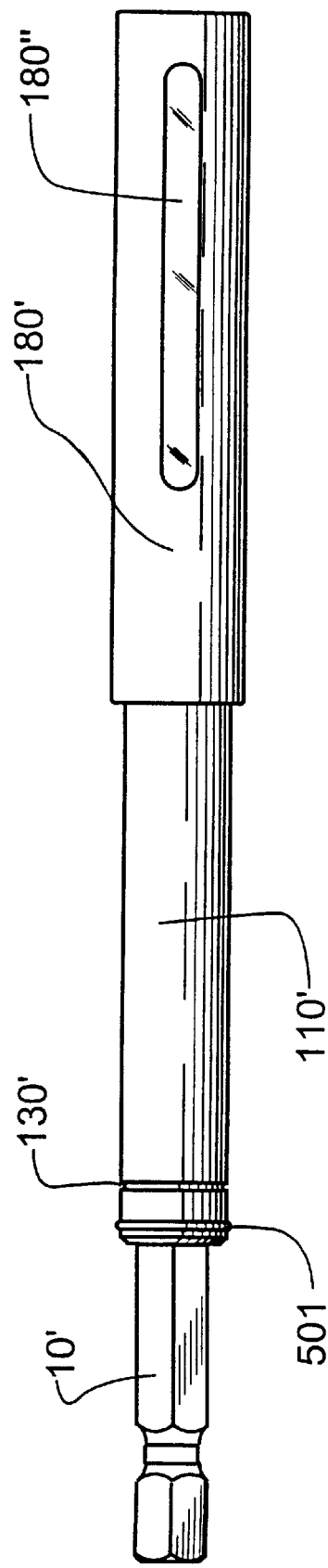
FIG. 34B is a side view of the device of FIG. 34A, showing the sleeve in its extended position.

A third embodiment of the invention is shown in FIGS. 17 and 18. A sleeve 183 is slidingly arranged on the connector 110 (as shown above). The sleeve 183 has a first end 210", adjacent the tool bit and a second end 220", adjacent the tool holder, of the assembled device. A narrow portion 353 is arranged at the first end, and an internal circumferential groove 190 is arranged at the second end of the sleeve. An internal ring 500, having a substantially circular cross-section, is arranged in the internal circumferential groove 190. The internal ring 500 cooperates with the circumferential groove 130 and the circumferential groove 135 on the connector 110, similar to the function of the first annular ridge 270 described in conjunction with the first embodiment of the invention.

FIGS. 19 and 20 show a holder as used in a screw guide device according to a fourth embodiment of the invention, similar to the first embodiment but with the further addition of a magnet 600, as described in conjunction with FIG. 13.

A fifth embodiment of a screw guide device according to the invention is shown in FIGS. 21 to 28. This embodiment employs an elongated connector 110 as described in conjunction with the first embodiment according to the invention. The connector thus has a first circumferential groove 130 and a second circumferential groove 135. A sleeve 184 is arranged to reciprocally slide on the connector 110 between two end positions. The sleeve 184 has a first end 187, adjacent the tool bit 300 and a second end 185, adjacent the tool holder 10, of the assembled device. A narrow portion 186 is formed at the end 187. The sleeve 184 further has a sunken recess 188, which is a portion of the sleeve with a smaller outer diameter than the largest outer diameter of the sleeve, arranged adjacent the second end 185. The recess 188 has a first step 191, adjacent the end 185, and a second step 192, facing away from the end 185. The steps 191, 192 and the surface of the recess 188 define a substantially tubular space in which a collar 200 is slidingly arranged. The collar 200 is substantially cylindrical, with an axial slit 202 running the entire length of the collar. The recess 188 further has a radial hole 189 therein and the collar 200 also has a radial hole 193, which is arranged to cooperate with a locking ball 170. The diameter of the radial hole 193 is slightly smaller than the diameter of the locking ball 170, so that the locking ball 170 is prevented from falling out of the collar 200 when the collar is assembled over the locking ball onto the sleeve 184. Similarly, the diameter of the radial hole 189 is slightly smaller then the diameter of the locking ball, so that the locking ball is prevented from passing through the radial hole 189. The locking ball protrudes a sufficient amount through the radial hole 189, when the device is assembled, to serve as a stop in either the first circumferential groove 130 or the second circumferential groove 135. A user of the holder may, by pressing the sleeve 184 in either direction along the connector 110, slide the sleeve between a first position, in which the locking ball 170 is seated in the first circumferential groove 130, to a second position, in which the locking ball is seated in the second circumferential groove 135. The collar 200 provides the necessary spring force to press the locking ball towards the radial hole 189. The collar is expanded if the user presses hard enough on the sleeve to permit the first locking ball to slide out of the first or second circumferential groove 130, 135, respectively.

FIGS. 29 to 33B show a seventh embodiment of a device according to the invention. The construction is comparable to what is shown in FIG. 17, a sleeve 183' is slidingly arranged on a connector 110'. The sleeve 183' has a first end 210''', adjacent the tool bit and a second end 220''', adjacent the tool holder, of the assembled device. The internal surface of the sleeve is stepped as at 2183' to provide a region of reduced internal diameter adjacent the end 220'''. An internal circumferential groove 190' is arranged at the reduced internal diameter end of the sleeve. An internal ring 500', having a substantially circular cross-section, is arranged in the internal circumferential groove 190'. The internal ring cooperates with a first circumferential groove 130' and a second circumferential groove 135 arranged on the connector, similar to the function of the first annular ridge 270 described in conjunction with the first embodiment of the invention, and also provides some friction and aids alignment. Further. the connector 110' has a mounting recess 132 for receiving a hex shaft tool mount 10'. The tool mount 10' has a generally hex cross-section and a knurled portion 10" arranged at an end of the tool mount which is insertable into the mounting recess 132. The knurled portion and the profile of the mounting recess are adapted to provide a secure fit of the tool mount. when inserted into the mounting recess. The knurled teeth on the knurled portion of the tool mount effectively prevent any rotation of the tool mount relative to the connector. The sleeve 183' is arranged to reciprocally slide over the connector 110' between two end positions, in which the sleeve is held by the internal ring 500' being held in either the first circumferential groove 130' or the second circumferential groove 135'. The connector further has a tool bit cavity 126' arranged at the end opposite the mounting recess. The tool bit cavity is preferably hex shaped, to accommodate standard hex tool bits. Preferably, a bit holding magnet 600' is arranged in the connector adjacent the tool bit cavity, to prevent the tool bits from failing out of the tool bit cavity. The retention ring or internal ring 500' is as described earlier for the internal ring of the embodiment of FIG. 17. A retaining ring 501 is arranged in a retaining groove 131 arranged on the outermost tip of the connector, i.e. further out than the first circumferential groove 130', to prevent the sleeve 183' from being slid too far back (towards the tool mount).

Although not specifically illustrated, it should be appreciated that the preceding embodiment can be produced with several concentric telescoping sleeves, just as in FIGS. 7 and 8. Each sleeve could be installed over the next inner sleeve just as the sleeve 183' is slidingly arranged on the connector 110', or could be installed by some other means such as in FIGS. 7 and 8.

In FIGS. 34A to 35B, an eighth embodiment of a device according to the invention is shown. A connector 110', as described in conjunction with the seventh embodiment has a sleeve 180' slidably mounted, as described earlier. The sleeve has a slat 180", preferably covered by a transparent material, for example see through plastic, to facilitate operation of the device. The user can see what happens inside the device, when it is moved or otherwise operated, to check if a screw is properly aligned with the tool bit etc.

In FIG. 36, a reversible drill bitscrew bit tool 700 is shown. The tool comprises a preferably hex portion 701 at one end of the tool, and a drill portion 705 at the other end of the tool. The hex portion has a screw driving end 706, shaped for engagement with a screw head. The hex portion 701 further has a first circumferential groove 707 and a second circumferential groove 708, for cooperating with the locking ball 170', as described above for the single bit tool. Thus, the reversible drill bitscrew bit tool 700 can be inserted into the axial bore of the connector 110' so that the drill portion 705 extends into the small diameter portion 125 and the hex portion 701 abuts the step 126, as shown in FIG. 37. The locking ball 170' is engaged in the circumferential groove 708, in this case. Alternatively, the reversible drill bit/screw bit tool 700 can be inserted into the axial bore of the connector 110' so that the screw driving end 706 extends into the small diameter portion 125 with a shoulder 709 of the screw driving end abutting the step 126, and the drill portion 705 extending out from the tool, as shown in FIG. 38. The locking ball 170' is engaged in the circumferential groove 707, in this case.

The device according to any of the described embodiments of the invention adds safety to the use of the device, because the sleeve may be extended to laterally stabilize a screw, or the like, during driving of the screw into a workpiece. In this way, the device prevents the screw from collapsing sideways during higher torque applications.

It will be appreciated that the above description relates to the preferred embodiments by way of example only. Many variations on the invention will be obvious to those knowledgeable in the field, and such obvious variations are within the scope of the invention as described and claimed, whether or not expressly described.

What is claimed is:

1. A holder for a tool bit for laterally stabilizing a screw applied to the tool bit comprising:

an elongated connector means having a first end and a second end, where the elongated connector means has a central longitudinal hole of a cross-section corresponding to the cross-section of a mounting portion of the tool bit, at the first end, and a tool mount at the second end, and where the elongated connector means has a first circumferential groove adjacent the second end and a second circumferential groove adjacent the first end, a first sleeve arranged to reciprocally slide over the connector means between a first end position and a second end position, where the first sleeve has a first end remote from the tool mount and a second end nearer the tool mount, wherein the first sleeve has an inwards facing annular ridge arranged at the second end of the first sleeve, so that the annular ridge is seated in the first circumferential groove when the sleeve is in the first end position, and the annular ridge is seated in the second circumferential groove when the sleeve is in the second end position, and wherein the holder further comprises one or more outer sleeves for holding a variety of different diameter screws arranged to reciprocally slide over the first sleeve between first end positions and second end positions.

2. A holder according to claim 1, wherein each of the sleeves further comprises one or more longitudinal slits arranged at the second end of the sleeve, to provide resilience to the second end of the sleeve.

3. A holder as recited in claim 1, further comprising means on said connector means for preventing retraction of said first sleeve substantially beyond said first position.

4. A holder as recited in claim 3, wherein said means for preventing retraction comprises a retention ring positioned in a groove around said connector means.

5. A holder according to claim 1, wherein the connector means further comprises a tool bit retaining means adjacent the first end.

6. A holder according to claim 5, wherein the tool bit retaining means is a magnet.

7. A holder according to claim 5, wherein the tool bit retaining means comprises a recess arranged on the outer surface of the connector means adjacent the second end, a substantially cylindrical collar slidingly movable in the recess, the collar having an axial slit running the entire length of the collar, the recess further having a radial hole and the collar also having a radial hole, arranged to cooperate with a locking ball, so that the locking ball protrudes a sufficient amount through the radial hole of the recess, when the holder is assembled, to serve as a stop in a corresponding groove in a tool bit, or similar, to hold the tool bit in place after insertion into the connector means.

8. A holder according to claim 1, wherein said first sleeve and said one or more sleeves for holding different diameter screws are identified by providing a tab on each of said first and said one or more sleeves.

9. A holder for a tool bit for laterally stabilizing a screw applied to the tool bit comprising:

an elongated connector means having a first end and a second end, wherein the elongated connector means has a central longitudinal hole, of a cross-section corresponding to the cross-section of a mounting portion of the tool bit, at the first end, and a tool mount at the second end, and where the elongated connector means has a first circumferential groove adjacent the second end and a second circumferential groove adjacent the first end, a first sleeve arranged to reciprocally slide over the connector between a first end position and a second end position, where the first sleeve has a first end remote from the tool mount and a second end nearer the tool mount, wherein the holder further comprises one or more outer sleeves for holding a variety of different diameter screws arranged to reciprocally slide over the first sleeve between first end positions and second end positions, and wherein the first sleeve has a recess arranged at the second end, the recess having a first step, adjacent the second end, and a second step, facing away from the second end, the steps and the surface of the recess defining a substantially tubular space in which a substantially cylindrical collar is slidingly arranged, the collar having an axial slit running the entire length of the collar, the recess further having a radial hole and the collar also having a radial hole, arranged to cooperate with a locking ball, the locking ball protruding a sufficient amount through the radial hole of the recess, when the holder is assembled, to serve as a stop for the first sleeve in either the first circumferential groove or the second circumferential groove.

10. A holder according to claim 9, wherein the connector means further comprises a tool bit retaining means adjacent the first end.

11. A holder according to claim 10, wherein the tool bit retaining means is a magnet.

12. A holder according to claim 10, wherein the tool bit retaining means comprises a recess arranged on the outer surface of the connector means adjacent the first end, a substantially cylindrical collar slidingly movable in the recess, the collar having an axial slit running the entire length of the collar, the recess further having a radial hole and the collar also having a fourth radial hole, arranged to cooperate with a second locking ball, so that the second locking ball protrudes a sufficient amount through the radial hole, when the device is assembled, to serve as a stop in a corresponding groove in a tool bit, or similar, to hold the tool bit in place after insertion into the connector means.

13. A holder according to claim 9, wherein said first sleeve and said one or more sleeves for holding different diameter screws are identified by providing a tab on each of said first and said one or more sleeves.

14. A holder according to claim 9, further comprising means on said connector means for preventing retraction of said first sleeve substantially beyond the first position.

15. A holder according to claim 14, wherein said means for preventing retraction comprises a retention ring positioned in a groove around said connector means.

* * * * *